(12) United States Patent
McKeeman et al.

(10) Patent No.: US 8,935,153 B2
(45) Date of Patent: Jan. 13, 2015

(54) NATURAL LANGUAGE INCIDENT RESOLUTION

(75) Inventors: Neil Andrew McKeeman, Penfield, NY (US); Jerry Shkavritko, West Henrietta, NY (US)

(73) Assignee: Xerox Corporation, Norwalk, CT (US)

( * ) Notice: Subject to any disclaimer, the term of this patent is extended or adjusted under 35 U.S.C. 154(b) by 162 days.

(21) Appl. No.: 13/432,405

(22) Filed: Mar. 28, 2012

(65) Prior Publication Data

US 2013/0262082 A1   Oct. 3, 2013

(51) Int. Cl.
*G06F 17/27* (2006.01)
*G10L 15/00* (2013.01)
*G10L 15/18* (2013.01)

(52) U.S. Cl.
USPC ............................................. 704/9; 704/257

(58) Field of Classification Search
USPC ............................................................ 704/9
See application file for complete search history.

(56) References Cited

U.S. PATENT DOCUMENTS

| | | | | |
|---|---|---|---|---|
| 6,263,333 B1 * | 7/2001 | Houchin et al. | ....................... | 1/1 |
| 6,591,257 B1 * | 7/2003 | Martinka et al. | ................. | 706/46 |
| 6,601,055 B1 * | 7/2003 | Roberts | ........................... | 706/45 |
| 6,687,749 B1 * | 2/2004 | Chavez et al. | ................. | 709/223 |
| 6,954,678 B1 * | 10/2005 | Phan et al. | ..................... | 700/121 |
| 6,957,202 B2 * | 10/2005 | Skaanning et al. | ............. | 706/20 |
| 8,249,830 B2 * | 8/2012 | Minhas et al. | ................. | 702/185 |
| 2006/0095392 A1 * | 5/2006 | Arend | ............................. | 706/45 |
| 2006/0285857 A1 * | 12/2006 | Swift | ................................ | 399/8 |
| 2007/0168758 A1 * | 7/2007 | Kolb et al. | ...................... | 714/46 |
| 2007/0192085 A1 * | 8/2007 | Roulland et al. | ................... | 704/9 |
| 2008/0294423 A1 * | 11/2008 | Castellani et al. | ................ | 704/4 |
| 2009/0106224 A1 * | 4/2009 | Roulland et al. | ................... | 707/5 |
| 2009/0156199 A1 * | 6/2009 | Steenstra et al. | ............. | 455/425 |
| 2009/0313219 A1 * | 12/2009 | Gupta et al. | ..................... | 707/3 |
| 2010/0131315 A1 * | 5/2010 | Gilbert et al. | ..................... | 705/7 |
| 2011/0055699 A1 * | 3/2011 | Li et al. | ......................... | 715/709 |

* cited by examiner

*Primary Examiner* — Richemond Dorvil
*Assistant Examiner* — Olujimi Adesanya
(74) *Attorney, Agent, or Firm* — Fay Sharpe LLP

(57) ABSTRACT

A natural language incident report resolution method and system are provided. Natural language incident reports received from a user are analyzed to determine a category associated with the incident. A database of existing incidents is analyzed to determine whether a report for the incident has already been submitted. The current status or state of the device associated with the incident is then ascertained and the incident, if new, is added to an incident database. If the incident is preexisting, the incident in the database is updated with the current status. A solution database is then queried to determine any solutions, automatic or manual workflows, that may correct the error or fault associated with the incident. The determined solution is communicated to the device associated with the incident for implementation.

20 Claims, 5 Drawing Sheets

NATURAL LANGUAGE INCIDENT RESOLUTION

BACKGROUND

The exemplary embodiment relates to natural language incident resolution for a document processing device. While the systems and methods described herein relate to incident resolution using natural language descriptions, it will be appreciated that the described techniques may find application in other natural language processing applications, for networked computing devices, complex machinery, fault reporting, and the like.

In support of various devices, incident reports or tickets are generated indicating the nature of the support issue, a party assigned to correct the issue, and the like. These reports or tickets may be input automatically from a device reporting a fault to a monitoring service, a telephone or electronic mail message submitted by a customer to a physical help desk, via a web-based interface, or the like. In each of the non-device reporting circumstances, the customer initiated reporting relies upon a human describing the problem associated with the device using human natural language. After the problem is described, the personnel associated with the help desk are tasked with interpreting the problem based upon this description and then acting upon it.

For example, when a customer or user submits an incident, (either via text form input or via a phone call) the user describes the problem using natural language. The support personnel triaging the incident must manually correlate the customer's language to the current machine state or machine state history. The time and effort this manual correlation takes is time and money that could be used elsewhere or captured and assessed to customers. For example, the device may report the current machine state to the support personnel. When the issue is noticed by the customer, the customer may submit the incident via text or telephone call, to the support personnel. The support personnel must then manually link the submittal from the device with the submittal by the customer, so as to avoid having duplicate submittals requiring action on the part of the support personnel.

Accordingly, there is an unmet need for systems and methods that facilitate reduction of duplicate incident reports and automated correlation of device reported and customer reported incidents.

BRIEF DESCRIPTION

In some illustrative embodiments disclosed as illustrative examples herein, a method for resolving natural language incident reports includes, with processor, receiving user submitted natural language incident information corresponding to an incident associated with a multifunction device, and analyzing the user submitted natural language incident information so as to determine a category associated therewith. The method further comprises comparing the received natural language incident information to incidents stored in an associated database corresponding to the determined category. In addition, the method includes retrieving current device status data from the multifunction device, and determining a solution in accordance with the received incident and the device status data.

In some illustrative embodiments disclosed as illustrative examples herein, a natural language incident report resolution system includes a processor with access to associated memory, the associated memory storing an associated incident database. The system also includes a device management component with access to a plurality of multifunction devices that retrieves associated device status, and a service management component, with to an associated database storing incident solutions, that responds to an incident associated with at least one multifunction device. The system also includes memory in communication with the processor, which stores instructions which are executed by the processor for receiving user submitted natural language incident information corresponding to an incident associated with at least one of the multifunction devices. The memory also stores instructions for analyzing the user submitted natural language incident information so as to determine an associated category, and for comparing the received natural language incident information to incidents stored in the associated incident database that correspond to the determined category. In addition, the memory stores instructions for analyzing current device status data retrieved by the device management component for the at least one multifunction device, and for implementing a solution determined by the service management component in accordance with the received incident and the device status data.

In some illustrative embodiments disclosed as illustrative examples herein, a computer-implemented method for resolving natural language incident reports includes receiving a natural language incident report of an incident associated with operation of a multifunction device, and with a processor, categorizing the incident report to determine a type of corresponding incident. The method further includes retrieving device status information of the multifunction device to determine current status of the incident, and responsive to determining the current status of the incident is active, querying a solution database for at least one solution corresponding to the type of incident. In addition, the method includes communicating the at least one solution to the multifunction device.

DETAILED DESCRIPTION

Figure 1:
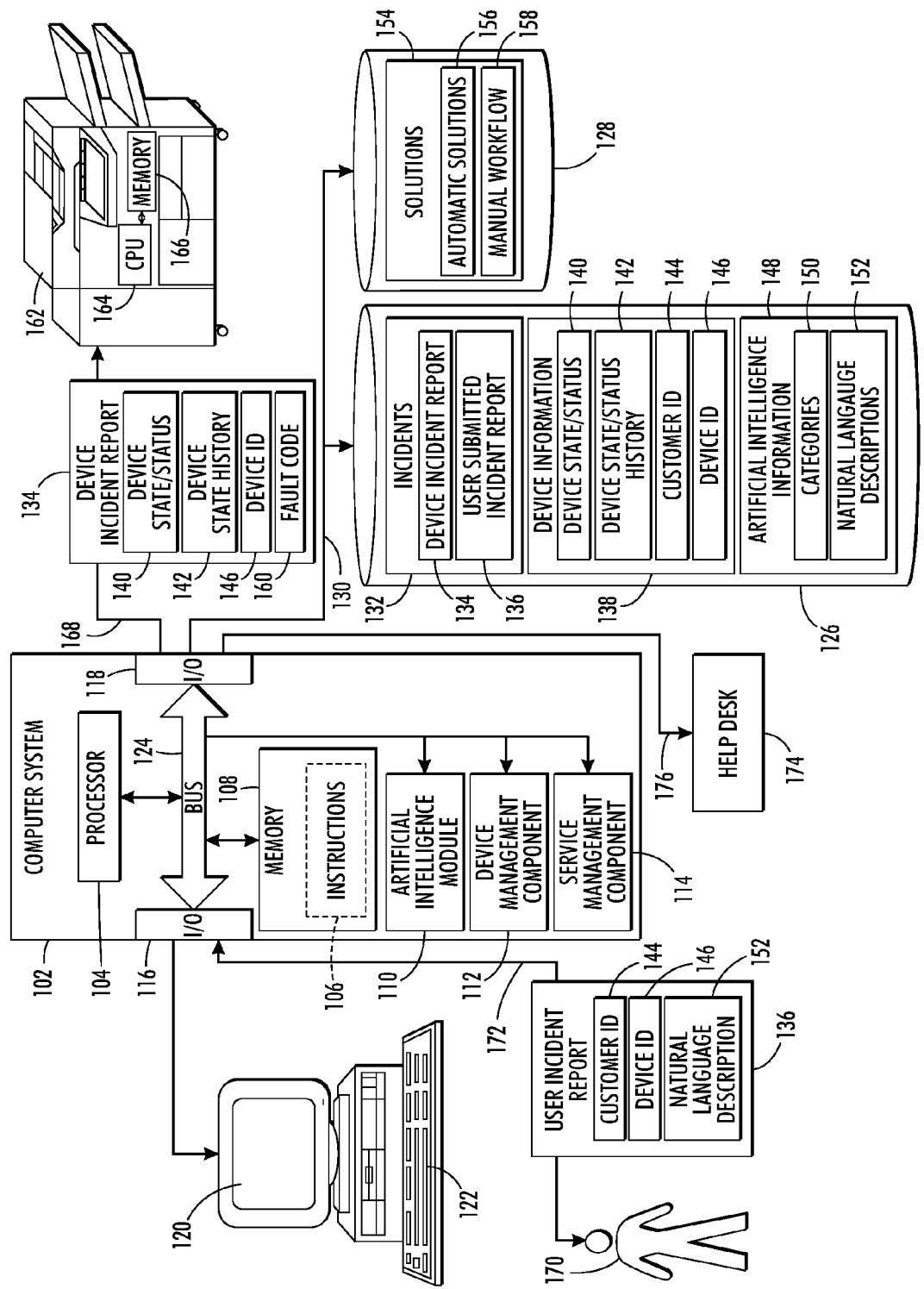
FIG. 1 is a high-level overview of an exemplary system for natural language incident resolution that facilitates automated incident reporting and resolution of a networked document processing device according to one embodiment.

One or more implementations of the subject application will now be described with reference to the attached drawings, wherein like reference numerals are used to refer to like elements throughout. Aspects of exemplary embodiments related to systems and methods are described hereinafter that facilitate resolving incidents using natural language descriptions.

With reference to FIG. 1, a natural language incident resolution system 100 is illustrated that facilitates resolving incidents that occur on a networked multifunction device 162. It will be appreciated that while reference is made herein with respect to the multifunction device 162, the subject systems and methods are equally adaptable to any device for which some form of service may be required, e.g., computers, servers, complex machinery, and the like. It will further be appreciated that the various components depicted in FIG. 1 are for purposes of illustrating aspects of the subject application, and that other similar components, implemented via hardware, software, or a combination thereof, are capable of being substituted therein.

It will be appreciated that the natural language incident report resolution system 100 is capable of implementation using a distributed computing environment, such as a computer network, which is representative of any distributed communications system capable of enabling the exchange of data between two or more electronic devices. It will be further appreciated that such a computer network includes, for example and without limitation, a virtual local area network, a wide area network, a personal area network, a local area network, the Internet, an intranet, or the any suitable combination thereof. Accordingly, such a computer network is comprised of physical layers and transport layers, as illustrated by the myriad of conventional data transport mechanisms, such as, for example and without limitation, Token-Ring, Ethernet, or other wireless or wire-based data communication mechanisms. Furthermore, while depicted in FIG. 1 as a networked set of components, the system and method are capable of implementation on a stand-alone device adapted to perform the methods described herein.

As shown in FIG. 1, the natural language incident report resolution determination system 100 includes a computer system 102, which is capable of implementing the exemplary method described below. The computer system 102 may include a computer server, workstation, personal computer, combination thereof, or any other computing device. According to varying embodiments disclosed herein, the computer system 102 may function as a device manager, a service manager, or both, facilitating the management and servicing of a plurality of networked devices, as discussed in greater detail below.

According to one example embodiment, the computer system 102 includes hardware, software, and/or any suitable combination thereof, configured to interact with an associated user, a networked device, e.g., the multifunction device 160, networked storage, e.g., the databases 126 and 128, remote devices, or the like. The exemplary computer system 102 includes a processor 104, which performs the exemplary method by execution of processing instructions 106 which are stored in memory 108 connected to the processor 104, as well as controlling the overall operation of the computer system 102. The computer system 102 further includes an artificial intelligence module 110, as discussed in greater detail below, which may be implemented via hardware, software, or combination thereof. In another example embodiment, the artificial intelligence module 110 may be comprised in the instructions 106 operable by the processor 104 to perform the natural language processing discussed below. Additionally, the computer system 102 may include a device management component 112 configured to manage a plurality of networked devices, e.g., the multifunction device 162 and the like, and a service management component 114 configured to provide servicing to the plurality of networked devices.

Computer system 102 also includes one or more interface devices 116, 118 for communicating with external devices.

The I/O interface 116 may communicate with one or more of a display device 120, for displaying information to users, such as device incident-related data, and a user input device 122, such as a keyboard or touch or writable screen, for inputting text, and/or a cursor control device, such as mouse, trackball, or the like, for communicating user input information and command selections to the processor 104. The various components of the computer system 102 may be all connected by a data/control bus 120. The processor 104 of the computer system 102 is in communication with associated data storage devices 126 and 128 via a link 130. A suitable communications link 130 may include, for example, the public switched telephone network, a proprietary communications network, infrared, optical, or any other suitable wired or wireless data transmission communications. The data storage devices 126 and 128, referenced as incident and solution databases below, are capable of implementation on components of the computer system 102, e.g., stored in local memory 108, e.g., on hard drives, virtual drives, or the like, or on remote memory accessible to the computer system 102.

The processor 104 of the computer system 102 is also in communication with an multifunction device 162 via a link 168. A suitable communications link 160 may include, for example, the public switched telephone network, a proprietary communications network, infrared, optical, or any other suitable wired or wireless data transmission communications. The multifunction device 162 is capable of implementation as standalone component of the system 100, as a component integrated with the computer system 102, or other such implementation. In varying embodiments described herein, the multifunction device 162 includes at least a processor (CPU 164) and associated memory 166. Accordingly, the multifunction device 162 is configured to perform a variety of functions, e.g., photocopying, printing, scanning, electronic communications, facsimile transmissions, and the like. The multifunction device 162 may be further configured to monitor device status 140, device state history 142, faults, errors, consumable usage, processor usage, jams, and the like. In one example embodiment, the multifunction device 162 is configured to generate device incident reports 134 comprising at least a fault code 160 indicative of a category or type associated with an error, consumable request, service request, etc., the device identification 146, the current device state/status 140, a history of device states/status 142, and the like. Such device incident report 134 may be reported via the link 168 to the computer system 102 as set forth in greater detail below with respect to FIGS. 2-4.

The computer system 102 may be a general or specific purpose computer, such as a PC, such as a desktop, a laptop, palmtop computer, portable digital assistant (PDA), server computer, cellular telephone, tablet computer, pager, combination thereof, or other computing device capable of executing instructions for performing the exemplary method.

The memory 108 may represent any type of non-transitory computer readable medium such as random access memory (RAM), read only memory (ROM), magnetic disk or tape, optical disk, flash memory, holographic memory, or any other tangible medium from which the processor 104 can read and execute. In one embodiment, the memory 108 comprises a combination of random access memory and read only memory. In some embodiments, the processor 104 and memory 108 may be combined in a single chip. The network interface(s) 116, 118 allow the computer to communicate with other devices via a computer network, and may comprise a modulator/demodulator (MODEM). Memory 108 may store data the processed in the method as well as the instructions for performing the exemplary method.

The processor 104 can be variously embodied, such as by a single core processor, a dual core processor (or more generally by a multiple core processor), a digital processor and cooperating math coprocessor, a digital controller, or the like. The processor 104, in addition to controlling the operation of the computer 102, executes instructions stored in memory 108 for performing the method outlined in FIG. 2.

The term "software," as used herein, is intended to encompass any collection or set of instructions executable by a computer or other digital system so as to configure the computer or other digital system to perform the task that is the intent of the software. The term "software" as used herein is also intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The system 100 may include at least some form of computer readable media. Computer readable media can be any available media that can be accessed by the system 100. For example, and without limitation, computer readable media may comprise computer storage media and communication media, e.g., the memory 108. Computer storage media includes volatile and nonvolatile, removable and non-removable media implemented in any method or technology for storage of information such as computer readable instructions, data structures, program modules or other data.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Communication media includes, for example, and without limitation, BLUETOOTH, WiMax, 802.11a, 802.11b, 802.11g, 802.11(x), a proprietary communications channel, infrared, optical, the public switched telephone network, or any suitable wireless data transmission system, or wired communications known in the art. Combinations of any of the above can also be included within the scope of computer readable media.

The associated data storage devices 126 and 128 correspond to any mass storage device(s), for example, magnetic storage drives, a hard disk drive, optical storage devices, flash memory devices, or a suitable combination thereof. The data storage devices 126 and 128 may be implemented as components of the computer system 102, e.g., resident in memory 108, or the like. According to one embodiment, the associated data storage devices 126 and 128 include data corresponding an incident database 126 and a solution database 128. As illustrated in FIG. 1, the incident database 126 may include incidents 132 comprising device incident reports 134 and user submitted incident reports 136; device information 138 comprising current device state/status information 140, device state/status history 142, customer identification information 144 and device identification information 146; and artificial intelligence information 148 comprising categories 150 associated with issues, faults, consumables, service calls, or the like, and natural language descriptions 152 corresponding to natural language descriptions associated with the aforementioned categories 150. The categories 150 are discussed in greater detail below. The solution database 128 comprises solutions 154 corresponding to the categories 150, and may include automatic solutions 156 (workflow solutions capable of implementation without user/service provider intervention) and manual workflow solutions 158 (solutions requiring the intervention of one or more individuals).

The system 100 of FIG. 1 may further include an associated user 170 in communication with the computer system 102 via the link 172. It will be appreciated that the link 172 is representative of any communications mechanism allowing the user 170 to interface with the computer system 102, provide information related to the multifunction device 162, and the like. While not shown in FIG. 1, the user 170 may communicate a user incident report 136, as explained in greater detail below, to the computer system 102 via interactions on a thin client interface, e.g., a web-based interface/reporting mechanism, via an electronic mail message communicated from an associated user device (personal computer, workstation, tablet, PDA, smartphone, notebook, etc.), via telephone conversation with a help desk 174 or other voice-based interactions, or the like. The user incident report 136 may at least include customer identification information 144, device identification 146, and a natural language description 152 associated with the incident necessitating the generation of the user incident report 136.

As briefly discussed above, an incident 132 associated with the multifunction device 162 may reflect a processing error, mechanical failure, mechanical noise, optical failure, the exhaustion of a consumable (toner, paper, etc.), component replacements, or myriad other issues associated with the proper operation of the multifunction device 162. Incidents 132 may be submitted by the user 170 via the user incident report 136 in which the user 170 provides customer identification 144, device identification 146, and a natural language description 152 of the issue associated with the multifunction device 162. Incidents 132 may also be submitted automatically by the multifunction device 162 in a device incident report 134 that will include the fault code 160 or other designated code associated with a detected issue, the device identification 146, the current device state/status 140, and a device state/status history 142, e.g., a preset number of previously stored faults/errors/issues, operational status of the device 162, and the like. This incidents are then communicated via links 172 or 168 to the computer system 102, as discussed in greater detail with respect to FIG. 2 below.

The use of the term "category" with respect to categories 150 is representative of type of incident 132 that may occur with respect to the multifunction device 162. A fault code 160 may directly correlate to a particular category 150, whereas a natural language description 152 may have to be interpreted by the artificial intelligence module 110 to determine the category in which the incident 132 should be placed. For example, a fault code 160 may correspond to a "drum replace" indication, while the user submitted natural language description may describe "the device is making lots of noise near the drum area", both of which may be categorized as the category of "drum replace." Additional examples of such categories 150 are presented in FIGS. 3-4, as discussed more fully below.

Figure 2:
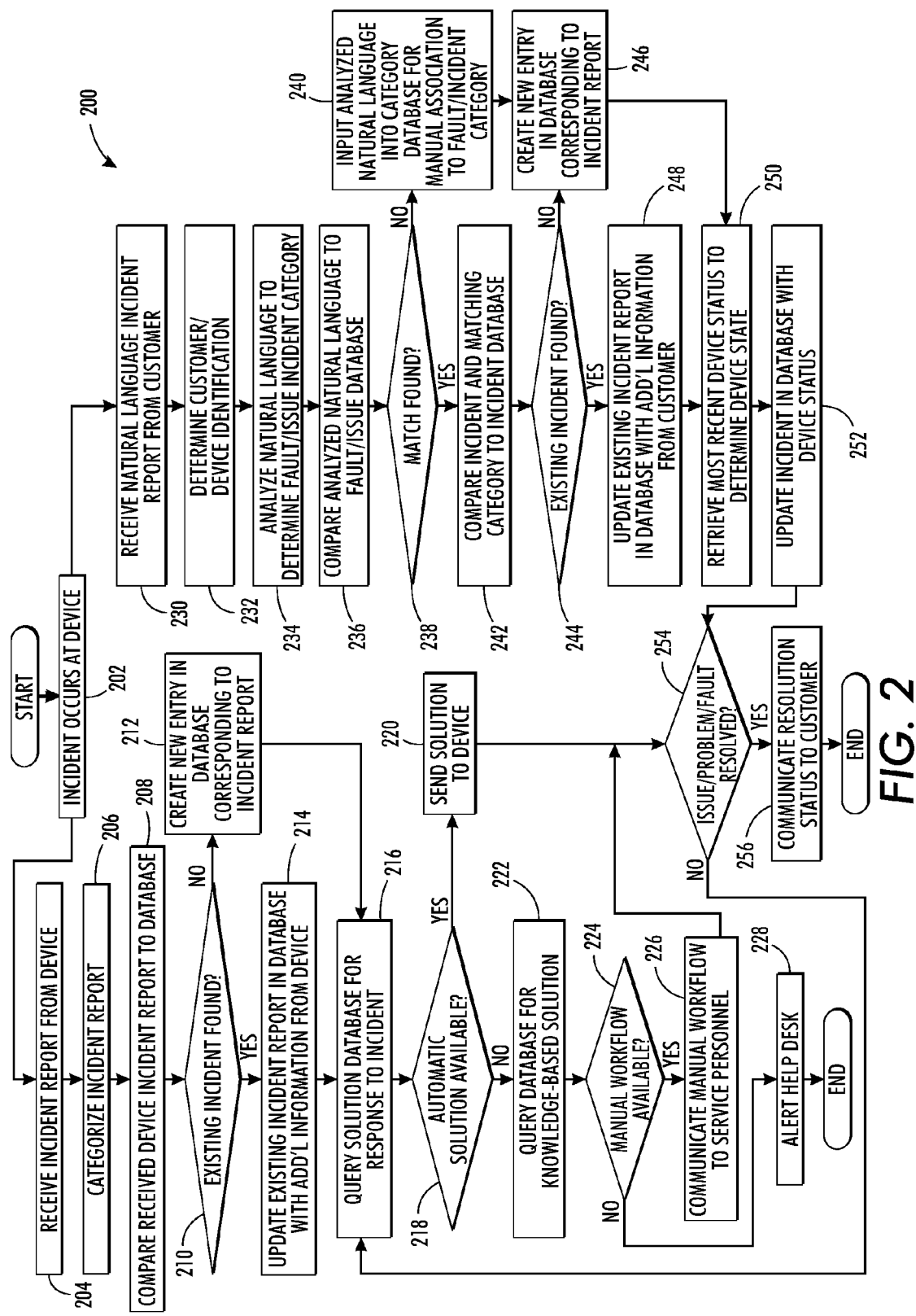
FIG. 2 is a flow chart which diagrammatically shows the operation of a natural language incident resolution method for automated incident reporting and resolution of a networked document processing device according to one embodiment.

Turning now to FIG. 2, there is shown a flow chart 200 illustrating an exemplary method for resolving natural language incident reports in accordance with one embodiment. As will be appreciated, the steps of the method need not all proceed in the order illustrated and fewer, more, or different steps may be performed. Operations described in FIG. 2 begin at 202, whereupon an incident 132 occurs at the multifunction device 162 As previously discussed, incidents 132 may correspond to optical faults, input tray faults, image quality faults, toner level faults, paper jams, fuser issues, paper levels, mechanical issues, auto feeder issues, and myriad additional faults, issues, or problems associated with the proper operations of the multifunction device 162. Additional incidents 132 may include consumable replacements, e.g., toner, paper, drums, inks, output media, and the like.

It will be appreciated that reporting of the incident 132 to the computer system 102 may be initiated first by the device 162 and then by the user 170, by the user 170 and then by the device 162, by one or the other, or contemporaneously by both. Thus, while precedence is given hereinafter with respect to the multifunction device 162 first reporting the incident 132, it will be understood that such precedence is only for purposes of describing the methodology illustrated in FIG. 2 and the user 170 is equally capable of first reporting the incident 132 associated with the device 162, e.g., the device 162 is turned off or incapable of network communications, power outages, etc. While reference is made herein to the computer system 102, other computer systems are also capable of implementation and use in accordance with the method of FIG. 2. Thus, at 204, the device management component 112 or other suitable component associated with the computer system 102 receives an incident report 134 from the multifunction device 162 corresponding to the incident 132 that has occurred, which is then passed to the service management component 114 for creation of an incident report 132 in the incident database 126. According to varying embodiments, the device management component 112 is configured to manage hardware, software, firmware, status information, and the like, associated with a plurality of networked devices, representatively illustrated in FIG. 1 as the multifunction device 162. It will be appreciated that the service management component 114 is configured to manage maintenance, upgrades, repairs, and the like, associated with the plurality of networked devices. The device and service management components 112 and 114 may be implemented as hardware, software, or a combination thereof, associated with the computer system 102 internally or communicatively coupled thereto.

The device incident report 134 may include the current device state/status 140, device state/status history 142, the identification 146 associated with the device 162, and the fault code 160 associated with the incident 132. In some embodiments, the fault code 160 may be analogous to the category associated with the incident 132, e.g., the fault code 160 may be a "drum replace" fault code, which corresponds to a "drum replace" category 150 for the artificial intelligence module 110.

At 206, the processor 104 or other suitable component associated with the computer system 102 categorizes the incident report 134 created from the service management component 114 based upon the fault code 160 associated therewith. In accordance with one aspect, an operation of the artificial intelligence module 110 may facilitate the categorization of the incident report 134 based upon the categories 150 stored with the artificial intelligence information 148 of the incident database 126. For example, the processor 104 may initiate the module 110 so as to determine the category 150 associated with the fault code 160 contained within the incident report 134.

The service management component 114 then facilitates the comparison of the received device incident report 134 to incidents 132 in the incident database 126 at 208. According to one embodiment, the incident database 126 is indexed so as to allow suitable querying by the service management component 114 or other component of the computer system 102 for one or more similar incidents. This querying may include, for example, device identification 146, the category, customer information 144 associated with the multifunction device 162, or the like. The comparison of 208 is thus performed so as to determine whether the incident identified by the device incident report 134 already exists in the incidents 132 stored on the incident database 126. It will be appreciated that such comparison enables the prevention of duplicate incident reports 134, 136 from being submitted by both a user 170 and the multifunction device 162.

A determination is then made at 210 based upon the comparison at 208 whether the incident of the device incident report 134 is already present in the incident database 126. Upon a negative determination, operations proceed to 212, whereupon a new incident 132 is created in the incident database 126 corresponding to the received device incident report 134. According to one embodiment, the additional information contained in the device incident report 134 is added in association with the incident 132 to the incident database 126, e.g., the current device state/status 140 and device state/status history 142 are added to the device information 138 associated with the reporting multifunction device 162. Operations then progress to 216 as discussed in greater detail below.

Returning to 210, upon a determination that the incident 132 described in the device incident report 134 is already present in the incident database 134, operations with respect to FIG. 2 proceed to 214. That is, when an incident 132 associated with the determined category 150, the device identification 146, etc., is determined to already exist in the database 126, the existing incident report 134 or 136 (depending upon whether the user 170 or the device 162 submitted the existing report) is updated at 214 with any additional information contained in the device incident report 134. For example, the existing incident 132 may be updated with the current device state/status data 140, new fault codes 160 (if any), and the like.

The service management component 114 or other suitable component associated with the computer system 102 then queries the solution database 128 for a suitable response to the reported incident 132 at 216. That is, a query is generated that may include the incident category 150, the device identification information 146, and the like. The search is then performed of the database 148 based upon the query for any solutions 154 that address the problem identified by the category of the incident report 134. Thus, at 218, a determination is made whether an automatic solution 156 is available in the database 128 to correct the underlying problem identified from the incident report 134. Upon a positive determination, the automated solution 156 is communicated via link 168 to the multifunction device 162 at 220. For example, when the fault code 160 indicates a paper jam, the automated solution may be to send a reboot command to the multifunction device 162, as the actual jam may have already been cleared, but the fault in memory 166 of the device 162 prevents operation of the device 162. Thus, the communication of the reboot command would clear the fault and allow the multifunction device 162 to resume normal operations.

A determination is then made at 254 whether the issue/problem/fault has been resolved by implementation of the automated solution 156. This determination at 254 may be made based upon a comparison of the current device status 140, which may be retrieved by the device management component 112, with the incident report 134 to determine if the multifunction device 162 is still in this fault state, i.e., whether the issue has been resolved. Upon a positive determination at 254, operations proceed to 256, whereupon the resolution status of the reported incident 132 is communicated to the associated user 170 or other administrative entity associated with the multifunction device 162. Returning to 254, a determination that the issue/problem/fault is not resolved results in a return to 216 for an additional query of the database 128 for a suitable solution. Upon a determination at 218 that no automated solution is available, the solution database 128 is queried at 222 for a knowledge-based solution to the issue/problem/fault associated with the incident report 134. It will be appreciated that the knowledge-based solution may include a manual workflow 158 that requires user interaction with the multifunction device 162 to remedy the incident. That is, the knowledge-based solution may set forth a manual workflow 158 of actions to be undertaken by a service technician, the user 170, or other individual so as to resolve the issue/problem/fault that caused the device 162 to generate the incident report 134.

A determination is then made at 224 whether a manual workflow 158 is available corresponding to the identified category 150 associated with the fault code 160 of the incident report 134. When such a manual workflow 158 is located in the database 128, the service management component 114 of the computer system 102 communicates this workflow 158 to the associated user 170, service technician, or the like, at 226. Operations then proceed to 254 as set forth above. Upon a determination at 224 that no manual workflow is available, or that the knowledge-based solution was unsuccessful, an alert is communicated to the help desk 174 via the link 176 at 228. It will be appreciated that the help desk 174 comprises certified technicians associated with a service provider, the manufacturer of the device 162, or the like. After resolution of the issue/problem/fault, or upon communication of the incident report 134 to the help desk 174, operations with respect to FIG. 2 terminate.

Returning to 202, a description is now provided for incident reports 1366 submitted by the associated user 170 that include natural language descriptions 152 of the issue/problem/fault associated with the multifunction device 162. At 230, the service management component 114 or other suitable component associated with the computer system 102 receives a user submitted natural language incident report 136 via the link 172. It will be appreciated that the communication of the report 136 may be accomplished via user interaction with a web-based interface associated with the computer system 102, e.g., a web page, browser interface, etc., via an electronic message (electronic mail, text message), via voice-interaction with an associated operator, via a dedicated application on a user device (personal computer, smart phone, tablet, etc.), or the like. According to one embodiment, the user submitted incident report 136 includes at least customer identification information 144, device identification information 146, and/or a natural language description of the issue/problem/fault associated with the multifunction device 162.

At 232, the service management component 114 determines the customer identification 144 and/or the device identification 146 associated with the user submitted incident report 136. It will be appreciated that some embodiments may only require the customer identification information 144, as only a single multifunction device 162 may be associated with the user 170, and thus ease identification of incidents 132 associated with the device 162 in the incident database 126. At 234, the natural language description 152 is analyzed via the artificial intelligence module 110 so as to determine the appropriate category 150 associated with the issue/problem/fault of the incident report 136. It will be appreciated that the artificial intelligence module 110 may be trained to recognize natural language descriptions 152 based upon previously submitted reports 136, based upon communications with the help desk 174, machine learning algorithms, and the like.

At 236, the analyzed natural language description 152 of the issue/problem/fault is compared to categories 150 stored on the incident database 126. According to one embodiment, the analysis and comparison may be undertaken by the artificial intelligence module 110. A determination is then made at 238 whether a match for the natural language description 152 of the issue/problem/fault was made with respect to the categories 150 stored on the incident database 126. Upon a negative determination, operations proceed to 240, whereupon the analyzed natural language description 52 is input into a category database for manual association of the description 152 with a category 152 corresponding to the issue/problem/fault associated with the incident report 136. A new entry is then created by the service management component 114 in the incident database 126 corresponding to the user submitted incident report 134 at 246, whereupon operations proceed to 250 as discussed in greater detail below.

Upon a determination at 238 that a match, i.e., a correlation, has been found between the natural language description 152 and the categories 150, operations proceed to 242. At 242, the incident reported in the user submitted natural language incident report 136 is compared to incidents 132 stored on the incident database 126. A determination is then made at 244 whether an existing incident in the database 126 has been found. In accordance with one embodiment, the service management component 114 generates a query for the database 126 including the incident the corresponding category 150 that was determined to match the natural language description 152.

At 244, a determination is made whether an existing incident 132 is found on the incident database 126 in response to the query referenced above. When no matching incident 132 is located in the database, a new incident entry in the database 126 is created by the service management component 114 corresponding to the received user submitted incident report 136 at 246. According to one embodiment, this new entry includes the information contained in the submitted incident report 136, e.g., the natural language description 152, the device identification information 146, the customer identification information 144, the category 152 determined to correspond to the natural language description 152, and the like. Operations then proceed to 250, as discussed in greater detail below.

Returning to 244, when an incident 132 is located in the incident database 126 that corresponds to the received incident report 136, e.g., an incident 132 that corresponds to the customer information 144, the device identification information 146, the category 150 associated with the natural language description 152, and the like, operations proceed to 248. At 248, the existing entry in the incident database 126 is updated in accordance with the category 150 derived from the natural language description 152, as well as any additional information submitted by the user 170 corresponding to the incident report 136. At 250, the device management component 112 or other suitable component associated with the computer system 102 retrieves the most recent device status 140 from the multifunction device 162 so as to determine the current device state, i.e., whether the multifunction device 162 is still in the same state that gave rise to the issue/problem/fault that prompted reporting by the associated user 170.

The incident 132 associated with the user submitted report 136 is then updated with this most recent device status 140 at 252. A determination is then made by the service management component 114 at 254 whether the issue/problem/fault corresponding to the determined category 150 has been resolved, as discussed in greater detail above. Operations then progress with respect to FIG. 2 as discussed above with respect to solution database 128 querying and communications of 216-256.

Figure 3:
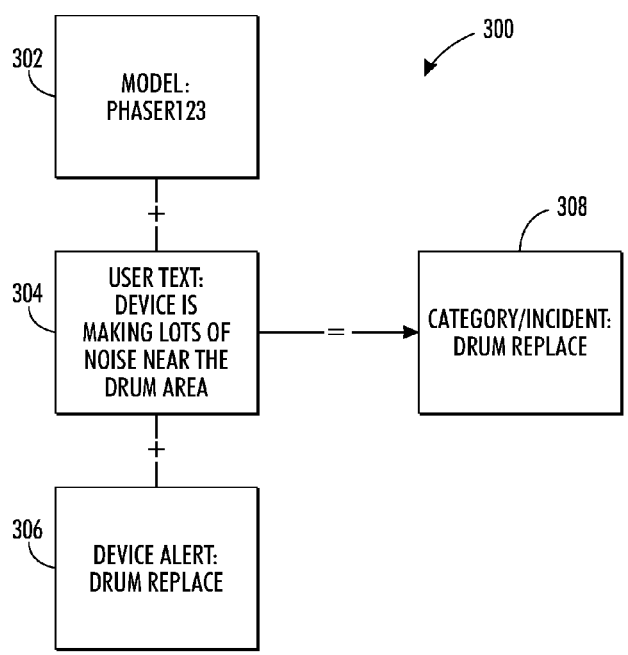
FIG. 3 diagrammatically illustrates a natural language incident report and resolution example according to one embodiment.

Turning now to FIG. 3, there is shown an example implementation in accordance with one embodiment. As shown, the block diagram 300 illustrates various inputs to the service management component 114 and the artificial intelligence module 110 for determining the category associated with a particular issue/problem/fault. The model information 302, representative of the device identification information 146 is combined with the natural language description 152, i.e., the user text 304 indicating the multifunction device 162 is making substantial noise in the drum area, and with a device submitted incident report, i.e., the device alert 306 indicating that the fault code 160 requires drum replacement. This information is analyzed by the artificial intelligence module 110 and the service management component so as to determine the category 150 of the incident, i.e., the drum replacement of 308. Although not shown, a solution 154 may be determined from the solution database 128, which indicates that replacement of the drum is the appropriate solution to the reported incident 128.

Using FIG. 3, the following example series of actions may be used to further explain operations of the methodology 200 illustrated above. Thus, the multifunction device 162, via the processor 164 or other suitable component, reports a Drum Replace alert 306 to a device management component 112 associated with the computer system 102, which then communicates this alert 306 to a service management component 114. The service management component 114 then creates an incident 132 for the Drum Replace alert 306 in the incident database 126. Personnel associated with the help desk 174 may then view this incident 132 and after triaging it send out a technician or other service person with a new drum for replacement on the multifunction device 162.

The user 170 may notice a noise in the drum area of the multifunction device 162. The user 170 then submits a service request, e.g., the user incident report 136, via a thin client interface (web-based interface) or other communication method writing a natural language description 304 that the device 162 is making noise near the drum area. The service management component receives the submittal via the web-based interface and runs the user's description of the problem through the artificial intelligence module 110, which returns the category of Drum Replace 308. The service management component 114 then adds the user's incident description 304 to the original incident 132 (generated from the device report 306) and closes the new incident description 304. The service management component 114 then retrieves the current device status 140 of the multifunction device 162 and the triage description of the original report 304 and relays this information to the user 170. The user 170 may then be satisfied that a technician or service person has been dispatched to correct the problem associated with the multifunction device 162.

Figure 4:
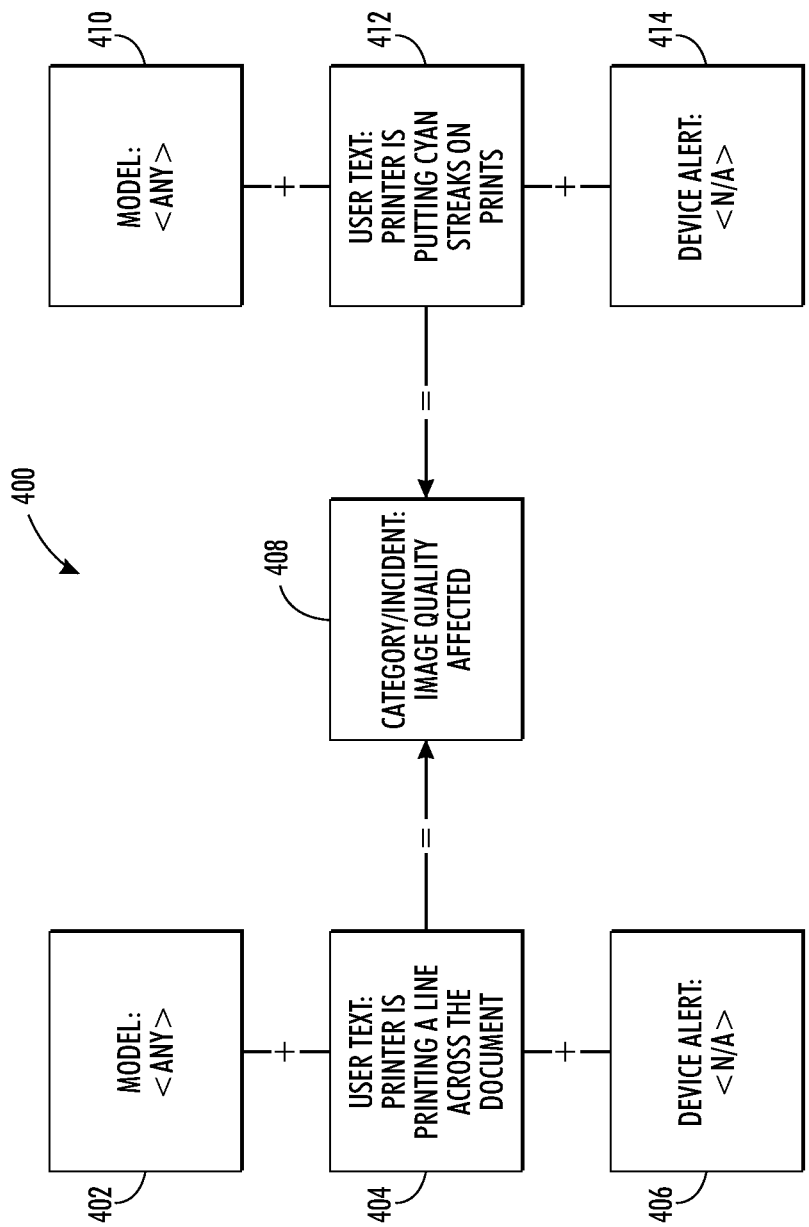
FIG. 4 diagrammatically illustrates a natural language incident report and resolution example according to one embodiment.

FIG. 4 illustrates another example implementation 400 involving multiple reports 136 from users without a corresponding device report 134 from the multifunction device 162, thus the model information 402 and 410 (e.g., device identification 150) is not submitted by the users, nor are any device alerts 406 or 414. Instead, the service management component 114 receives natural language descriptions 404 and 412 from users indicating some issue with the multifunction device 162. That is, the user 170 may notice some defect in the output of the multifunction device 162. One user 170 submits a service request, e.g., the user incident report 136, via a thin client interface (web-based interface) or other communication method writing a natural language description 404 that the device 162 is printing a line across the document. The service management component 114 receives the submittal via the web-based interface and runs the user's description of the problem through the artificial intelligence module 110, which returns the category of image quality affect 408. The service management component 114 then creates an incident 132 in the incident database 146 corresponding to the received user description 404 and determined category 408. Similarly, another user may submit a service request 412 using natural language indicating that the printer is putting cyan streaks on prints.

The service management component 114 adds the new user's incident description 412 to the original incident 132 (generated from the first user's report 404) and closes the new incident description 412. The additional description language of the incident 412 may be added to the existing incident to assist in correcting the problem. Personnel associated with the help desk 174 may then view this incident 132 and after triaging it send out a technician or other service person to repair the image quality of the multifunction device 162. The service management component 114 then retrieves the current device status 140 of the multifunction device 162 and the triage description from the help desk 174 and relays this information to the users 170. The users 170 may then be satisfied that a technician or service person has been dispatched to correct the problem associated with the multifunction device 162.

FIG. 5

Figure 5:
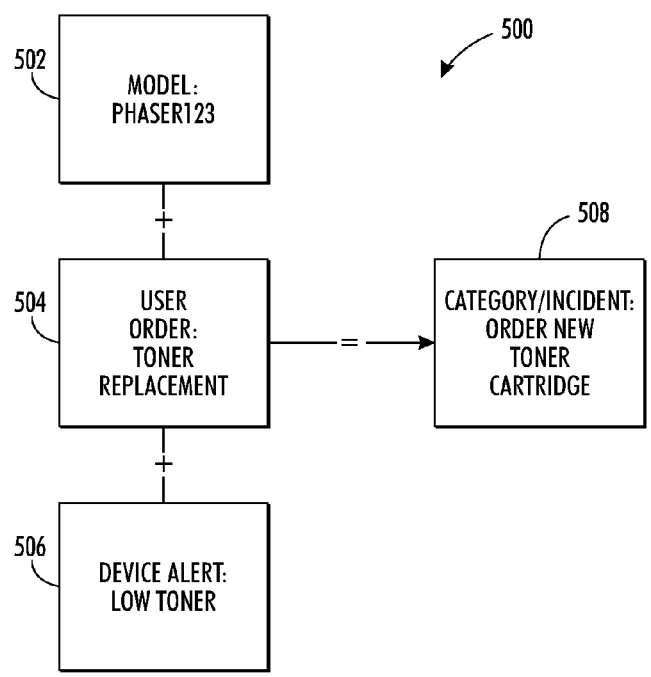
FIG. 5 diagrammatically illustrates a natural language incident report and resolution example according to one embodiment.

FIG. 5 illustrates still another example series of actions 500 may be used to further explain operations of the methodology 200 illustrated above in the context of a consumable replacement operation, e.g., low toner. Thus, the multifunction device 162, via the processor 164 or other suitable component, reports a Low Toner state alert 506 to a device management component 112 associated with the computer system 102, which then communicates this alert 506 to a service management component 114. The service management component 114 then creates an incident 132 for the Low Toner alert 506 in the incident database 126. The service management component 114 may create the incident 132 with a supply order for additional toner.

The user 170 may approach the multifunction device 162 and notice that a low toner indicator is visible on the multifunction device 162. The user 170 then submits an order resupply request 504, e.g., the user incident report 136, via a thin client interface (web-based interface) or other communication method so as to place an order for new toner (note, the submittal by the user 170 may or may not be written using a natural language description, instead simply allowing for normal ordering processing). The service management component 114 receives the submittal via the web-based interface and, if necessary, runs the user's description of the problem through the artificial intelligence module 110, which returns the category of Low Toner 508. The service management component 114 then determines that an order for new toner has already been placed via the device alert 506, and responds to the user's submitted order 504 that this incident 132 (generated from the device alert 506) has been addressed and new toner has already been ordered, such that the new order 504 is discarded. The user 170 may then be satisfied that new toner has been ordered and is on its way for the associated multifunction device 162.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for resolving natural language incident reports, comprising:
    with a processor, receiving a user submitted natural language incident report corresponding to a natural language description of an incident associated with a multifunction device;
    analyzing the user submitted natural language incident report so as to determine a category associated with the incident described therein;
    comparing the received natural language incident report to unresolved incident reports for the same multifunction device stored in an associated database corresponding to the determined category, so as to determine whether the incident described in the received incident report has already been submitted by at least one of the same user, another user, or the same multifunction device and remains unresolved;
    retrieving current device status data from the same associated multifunction device;
    adding a new entry to the associated database corresponding to the received natural language incident report and retrieved current device status data responsive to a determination that the incident described in the received incident report does not correspond to an existing incident report; and
    determining a solution in accordance with the received incident report and the device status data.

2. The method of claim 1, wherein determining a solution further comprises:
    querying a solution database for at least one of a manual workflow and an automatic workflow solution to the received incident; and
    communicating at least one of the manual workflow or the automatic workflow solution to the associated multifunction device or the user.

3. The method of claim 2, further comprising communicating the determined solution to at least one of the associated multifunction device or a user corresponding to the submitted natural language incident report.

4. The method of claim 2, further comprising:
    receiving a device incident report from an associated multifunction device corresponding to an incident associated with the operation thereof;
    comparing the received device incident report to the incident reports stored in the associated database;
    querying a solution database for at least one of a manual workflow and an automatic workflow solution to the received incident report; and
    communicating at least one of the manual workflow or the automatic workflow solution to the associated multifunction device or the user.

5. The method of claim 1, further comprising:
    determining that an existing incident report in the database corresponds to the user submitted natural language incident report in accordance with the comparison; and
    updating the existing incident report in accordance with the received natural language incident report and the retrieved current device status.

6. The method of claim 5, wherein the user submitted natural language incident report further comprises at least one of a customer identification and an identification associated with the multifunction device, and wherein determining that the existing incident report corresponds to the received user submitted natural language incident report further comprises comparing the customer identification or document processing device identification to the incident reports stored in the associated database.

7. The method of claim 1, wherein the category comprises at least one of a fault, an error, a consumable request, or a replacement request.

8. The method of claim 1, further comprising:
    determining no solution is available corresponding to the received incident report and the device status data; and
    generating an alert to a service provider in response thereto.

9. The method of claim 1, wherein the analyzing user submitted natural language incident report further comprises:
    receiving the submitted natural language description into an artificial intelligence classification component; and
    categorizing the incident described by the submitted natural language of the received incident report into one of a set of categories associated with incidents corresponding to the associated multifunction device.

10. The method of claim 9, wherein the category comprises at least one of a fault, an error, a consumable request, or a replacement request.

11. The method of claim 9, further comprising training the artificial intelligence classification component to associate the received submitted natural language incident report with a selected category in the associated database.

12. The method of claim 1, wherein the user submitted natural language incident report is received via a thin client interface, an electronic mail message, or an interactive telephonic system.

13. A computer program product comprising a non-transitory recording medium storing instructions, which when executed by a computer causes the computer to perform the method of claim 1.

14. A system for resolving natural language incident reports comprising memory which stores instructions for performing the method of claim 1 and a processor in communication with the memory for executing the instructions.

15. A natural language incident report resolution system, comprising:
    a processor with access to associated memory, the associated memory storing an associated incident database; and
    memory in communication with the processor, which stores instructions which are executed by the processor for:
        retrieving, via a device management component having access to a plurality of multifunction devices, device status associated therewith;
        receiving a user submitted natural language incident report corresponding to an incident associated with at least one of the plurality of multifunction devices;
        accessing a plurality of incident solutions stored in an associated database via a service management component in communication therewith;
        analyzing the user submitted natural language incident report so as to determine a category associated therewith;
        comparing the received natural language incident report to unresolved incident reports associated with the same at least one multifunction device stored in the associated incident database corresponding to the determined category, so as to determine whether the incident described in the received incident report has already been submitted by at least one of the same user, another user, or the same multifunction device and remains unresolved;

analyzing current device status data retrieved by the device management component for the same at least one multifunction device;

adding a new entry to the associated database corresponding to the received natural language incident report and current device status data responsive to a determination that the incident described in the received incident report does not correspond to an existing incident report;

updating an existing incident report in accordance with additional information in the received natural language incident report and the retrieved current device status responsive to a determination that the incident described in the received incident report corresponds to the existing incident report and remains unresolved;

determining, via the service management component, a solution in accordance with the received incident report and the device status data; and implementing the determined solution.

16. The system of claim 15, further comprising an artificial intelligence module that categorizes the incident described in the submitted natural language incident report into one of a set of categories associated with incident reports corresponding to the at least one multifunction device.

17. The system of claim 16, wherein the memory further includes instructions which are executed by the processor for training the artificial intelligence module to associate the received submitted natural language incident report with a selected category in the associated incident database.

18. The system of claim 15, wherein the memory further includes instructions which are executed by the processor for:

updating the existing incident report in accordance with the category determined from the received natural language incident report and the retrieved current device status.

19. The system of claim 15, wherein the solution database further comprises at least one of a manual workflow and an automatic workflow solution to a received incident report, and wherein the memory further includes instructions which are executed by the processor for:

receiving a device incident report from an associated multifunction device corresponding to an incident associated with the operation thereof;

comparing the received device incident report to incident reports stored in the associated database;

querying the solution database for at least one of a manual workflow and an automatic workflow solution to the incident in the received incident report; and communicating at least one of the manual workflow or the automatic workflow solution to the associated multifunction device or the user.

20. A computer-implemented method for resolving natural language incident reports, comprising:

receiving a natural language incident report of an incident associated with operation of a multifunction device;

categorizing the natural language incident report to determine a type of incident corresponding thereto;

comparing the received natural language incident report to incident reports associated with the same multifunction device stored in an associated incident database corresponding to the determined type of incident, so as to determine whether the incident described in the received incident report has already been submitted by at least one of the same user, another user, or the same multifunction device and remains unresolved;

retrieving device status information of the same multifunction device to determine current status of the incident;

adding a new entry to the associated database corresponding to the received natural language incident report and retrieved current device status data responsive to a determination that the incident described in the received incident report does not correspond to an existing incident report;

responsive to determining the current status of the incident is active and unresolved, updating an existing incident report in accordance with additional information in the received natural language incident report and the retrieved current device status responsive to a determination that the incident described in the received incident report corresponds to the existing incident report and remains unresolved, and querying a solution database for at least one solution corresponding to the type of incident; and communicating the at least one solution to the multifunction device, wherein at least one of the receiving, categorizing, comparing, retrieving, querying, and communicating is performed with a processor in communication with memory.

* * * * *